US009137714B2

(12) United States Patent
Hamalainen et al.

(10) Patent No.: US 9,137,714 B2
(45) Date of Patent: Sep. 15, 2015

(54) METHOD AND APPARATUS

(71) Applicant: Nokia Siemens Networks Oy, Espoo (FI)

(72) Inventors: Seppo Olavi Hamalainen, Espoo (FI); Osman Nuri Can Yilmaz, Helsinki (FI); Jyri Hamalainen, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 213 days.

(21) Appl. No.: 13/868,222

(22) Filed: Apr. 23, 2013

(65) Prior Publication Data
US 2013/0288681 A1   Oct. 31, 2013

(30) Foreign Application Priority Data

Apr. 27, 2012  (EP) .................. PCT/EP2012/057757

(51) Int. Cl.
H04W 36/00  (2009.01)
H04W 52/02  (2009.01)

(52) U.S. Cl.
CPC ...... *H04W 36/0061* (2013.01); *H04W 52/0206* (2013.01); *Y02B 60/50* (2013.01)

(58) Field of Classification Search
CPC .................. H04W 36/0061; H04W 52/0206; Y02B 60/50
USPC .................................. 455/418–420, 436–438
See application file for complete search history.

(56) References Cited

U.S. PATENT DOCUMENTS

| 2009/0290561 | A1 | 11/2009 | Kleindl | |
| 2012/0164955 | A1* | 6/2012 | Amirijoo et al. | 455/67.11 |
| 2014/0146700 | A1* | 5/2014 | Fonseca Dos Santos et al. | 370/252 |

FOREIGN PATENT DOCUMENTS

EP   2 424 325 A1   2/2012

OTHER PUBLICATIONS

3rd Generation Partnership Project; Technical Specification Group Radio Access Network; Evolved Universal Terrestrial Radio Access (E-UTRA); Potential solutions for energy saving for E-UTRAN (Release 10); 3GPP Standard; 3GPP TR 36.927; 3rd Generation Partnership Project (3GPP); Mobile Competence Centre; 650, Route des Lucioles; F-06921 Sophia-Antipolis Cedex; France; vol. RAN WG3, No. 10.1.0, Sep. 26, 2011, pp. 1-22, XP050554061, [retrieved on Sep. 26, 2011], paragraph [5.1.2.3].

"3rd Generation Partnership Project; Technical Specification Group Radio Access Network; Evolved Universal Terrestrial Radio Access (E-UTRA); Radio Resource Control (RRC); Protocol specification (Release 10)"; 3GPP Standard; 3GPP TS 36.331; 3rd Generation Partnership Project (3GPP); Mobile Competence Centre; 650, Route des Lucioles; F-06921 Sophia-Antipolis Cedex; France; vol. RAN WG2, No. V10.4.0, Dec. 20, 2011, pp. 1-296, XP050555028, [retrieved on Dec. 20, 2011]; paragraph [5.5.1] paragraph [5.5.4.2].

(Continued)

*Primary Examiner* — Kashif Siddiqui
(74) *Attorney, Agent, or Firm* — Squire Patton Boggs (US) LLP

(57) ABSTRACT

A method comprises receiving from a plurality of user equipment signal information for at least one cell, and using said information to determine if a candidate cell is to enter a reduced power mode.

15 Claims, 3 Drawing Sheets

Fig. 1

(56) References Cited

OTHER PUBLICATIONS

Nokia Siemens Networks et al: "Issues and Enhanced Framework for the Energy Saving Use Case"; 3GPP Draft; R3-081281; 3rd Generation Partnership Project (3GPP); Mobile Competence Center; 650, Route des Lucioles; F-06921 Sophia-Antipolis Cecex; France; vol. RAN WG3, no. Kansas City, USA; 20080430, Apr. 30, 2008, XP050164457, [retrieved on Apr. 30, 2008]; paragraph [0003], paragraph [04.2].

International Search Report and Written Opinion application No. PCT/EP2012/057757 dated Oct. 31, 2012.

* cited by examiner

METHOD AND APPARATUS

FIELD OF APPLICATION

Embodiments relate a method and an apparatus and in particular but not exclusively to a method and apparatus for determining if a cell can be used in a reduced energy mode.

BACKGROUND

A communication system can be seen as a facility that enables communication sessions between two or more entities such as mobile communication devices and/or other stations associated with the communication system. A communication system and a compatible communication device typically operate in accordance with a given standard or specification which sets out what the various entities associated with the system are permitted to do and how that should be achieved. For example, the manner how the communication device can access the communication system and how communications shall be implemented between communicating devices, the elements of the communication network and/or other communication devices is typically defined.

In a wireless communication system at least a part of communications between at least two stations occurs over a wireless link. Examples of wireless systems include public land mobile networks (PLMN), satellite based communication systems and different wireless local networks, for example wireless local area networks (WLAN). In wireless systems a network element or network entity (NE) or access node is provided by a base station. The radio coverage area of a base station is known as a cell, and therefore the wireless systems are often referred to as cellular systems. In some systems, for example a 3GPP standard system, a base station access node is called Node B (NB) or an enhanced Node B (eNB).

A user can access the communication system by means of an appropriate communication device. A communication device of a user is often referred to as user equipment (UE). A communication device is provided with an appropriate signal receiving and transmitting arrangement for enabling communications with other parties. A communication device may be arranged to communicate, for example, data for carrying communications such as voice, electronic mail (email), text message, multimedia, for enabling internet access and so on. Users may thus be offered and provided numerous services via their communication devices. The communication connection can be provided by means of one or more data bearers.

In wireless systems a communication device provides a transceiver station that can communicate with the access node and/or another communications device. A communication device or user equipment may also be considered as being a part of a communication system. In certain applications, for example in ad-hoc networks, the communication system can be based on use of a plurality of user equipment capable of communicating with each other.

Network management is a complex task. Complexity arises on the one side from the number of network elements (NEs) that have to be deployed and managed, and on the other side from interdependencies between the configuration and the status of the deployed network elements in terms of performance, faults, etc. In a heterogeneous network the variety of deployed technologies and their proprietary operational paradigms are difficult to handle. The configuration, optimization and troubleshooting of the management of the network therefore requires high expertise and operational management workflows to be typically performed by human operators supported by software tools. However, such manual and semi-automated management is time-consuming, error-prone, and potentially unable to react quickly enough to network changes and thus expensive.

It has been a goal of network management designers to attempt to automate operation, administration and management (OAM) functions by the deployment of "Self Organizing Networks" (SON). While SON concepts are generically applicable, these focus of developments has been to Radio Access Networks (RAN) due to the large number of NE (base stations) distributed over large geographical areas (and thus the incurred cost to doing remote and on-site management activities). In particular, for the long term evolution (LTE) and long term evolution-advanced (LTE-A) radio access network (RAN) standards such as evolved universal mobile telecommunications system (UMTS) Terrestrial Radio Access Network (E-UTRAN), SON is considered a useful building block, due to the potential high degree of distribution and heterogeneity. In such networks there may be a wide range of telecommunications standards being employed such as concurrent operation of 2G/3G/LTE/LTE-A network elements. Furthermore LTE networks may be heterogeneous in structure, for example employing LTE multi-layer structures where there can be pico cells, micro cells, and macro cells all operating over the same geographical range.

According to an aspect, there is provided a method comprising: receiving from a plurality of user equipment signal information for at least one cell; and using said information to determine if a candidate cell is to enter a reduced power mode.

The signal information may be handover information.

The signal information may comprise at least one of signal strength information and signal quality information.

The signal information may comprise at least one of reference signal receive power and reference signal receive quality.

The method may comprise receiving from each of said plurality of user equipment, signal information for a serving cell and at least one other cell, different to said candidate cell.

The method may comprise receiving information for each cell neighbouring said candidate cell for which a determination is to be made as to whether said candidate cell is to enter a reduced power mode.

The method may comprise using said received information to determine a probability of an outage for a user equipment if said candidate cell is entered into a reduced power mode.

The determining a probability of an outage may be dependent on information for one or more user equipment which only receive signals from a serving cell.

The candidate cell may be entered into a reduced power mode if said probability of an outage is less than a threshold.

The reduced power mode may comprise switching said cell off.

The method may comprise if it is determined that a candidate cell is not to enter a reduced power mode, causing at least one parameter of at least one neighbouring cell to be altered and repeating said method.

The at least one parameter may comprise at least one of antenna configuration; antenna orientation; transmission power; and uplink power control parameters.

The method may be performed in a base station, a controller, element manager or network management system.

A computer program comprising program code means adapted to perform the method may also be provided. The computer program may be stored and/or otherwise embodied by means of a carrier medium.

According to another aspect, there is provided an apparatus comprising: means for receiving from a plurality of user equipment signal information for at least one cell; means for using said information to determine if a candidate cell is to enter a reduced power mode.

The signal information may be handover information.

The signal information may comprise at least one of signal strength information and signal quality information.

The signal information may comprise at least one of reference signal receive power and reference signal receive quality.

The using means may be for comparing said signal information for at least one cell with a minimum value for said signal information.

The using means may be for comparing said signal information for at least one cell with a minimum value for said signal information.

The receiving means may receive from each of said plurality of user equipment, signal information for a serving cell and at least one other cell, different to said candidate cell.

The receiving means may receive information for each cell neighbouring said candidate cell for which a determination is to be made as to whether said candidate cell is to enter a reduced power mode.

The using means may be for using said received information to determine a probability of an outage for a user equipment if said candidate cell is entered into a reduced power mode.

The using means may be for determining a probability of an outage dependent on information from one or more user equipment which only receive signals from a serving cell.

The using means may be for entering said candidate cell into a reduced power mode if said probability of an outage is less than a threshold.

The reduced power mode may comprise switching said cell off.

The using means may if it is determined that a candidate cell is not to enter a reduced power mode, cause at least one parameter of at least one neighbouring cell to be altered and repeating said method.

The at least one parameter may comprise at least one of antenna configuration; antenna orientation; transmission power; and uplink power control parameters.

According to another aspect, there is provided an apparatus comprising at least one processor and at least one memory including computer code for one or more programs, the at least one memory and the computer code configured, with the at least one processor, to cause the apparatus at least to: receive from a plurality of user equipment signal information for at least one cell; and use said information to determine if a candidate cell is to enter a reduced power mode.

The signal information may be handover information.

The signal information may comprise at least one of signal strength information and signal quality information.

The signal information may comprise at least one of reference signal receive power and reference signal receive quality.

The at least one memory and the computer code may be configured, with the at least one processor, to cause the apparatus to receive from each of said plurality of user equipment, signal information for a serving cell and at least one other cell, different to the candidate cell.

The at least one memory and the computer code may be configured, with the at least one processor, to cause the apparatus to receive information for each cell neighbouring said candidate cell for which a determination is to be made as to whether said candidate cell is to enter a reduced power mode.

The at least one memory and the computer code may be configured, with the at least one processor, to cause the apparatus to use said received information to determine a probability of an outage for a user equipment if said candidate cell is entered into a reduced power mode.

The at least one memory and the computer code may be configured, with the at least one processor, to cause the apparatus to determining a probability of an outage by determining one or more user equipment which only receive signals from a serving cell.

The at least one memory and the computer code may be configured, with the at least one processor, to cause the apparatus to cause said candidate cell to be entered into a reduced power mode depending on a probability of an outage. In some embodiments the candidate cell may be entered into a reduced power mode if a probability of an outage is less than a threshold.

The reduced power mode may comprise switching said cell off.

If it is determined that a candidate cell is not to enter a reduced power mode, the at least one memory and the computer code may be configured, with the at least one processor, to cause at least one parameter of at least one neighbouring cell to be altered and repeating the analysis or method.

The at least one parameter may comprise at least one of antenna configuration; antenna orientation; transmission power; and uplink power control parameters.

A base station, controller, element manager or network management system may comprise the apparatus.

Various other aspects and further embodiments are also described in the following detailed description and in the attached claims.

SUMMARY OF THE FIGURES

Embodiments will now be described in further detail, by way of example only, with reference to the following examples and accompanying drawings, in which.

DESCRIPTION OF EMBODIMENTS

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 and 2 to assist in understanding the technology underlying the described examples.

Figure 1:
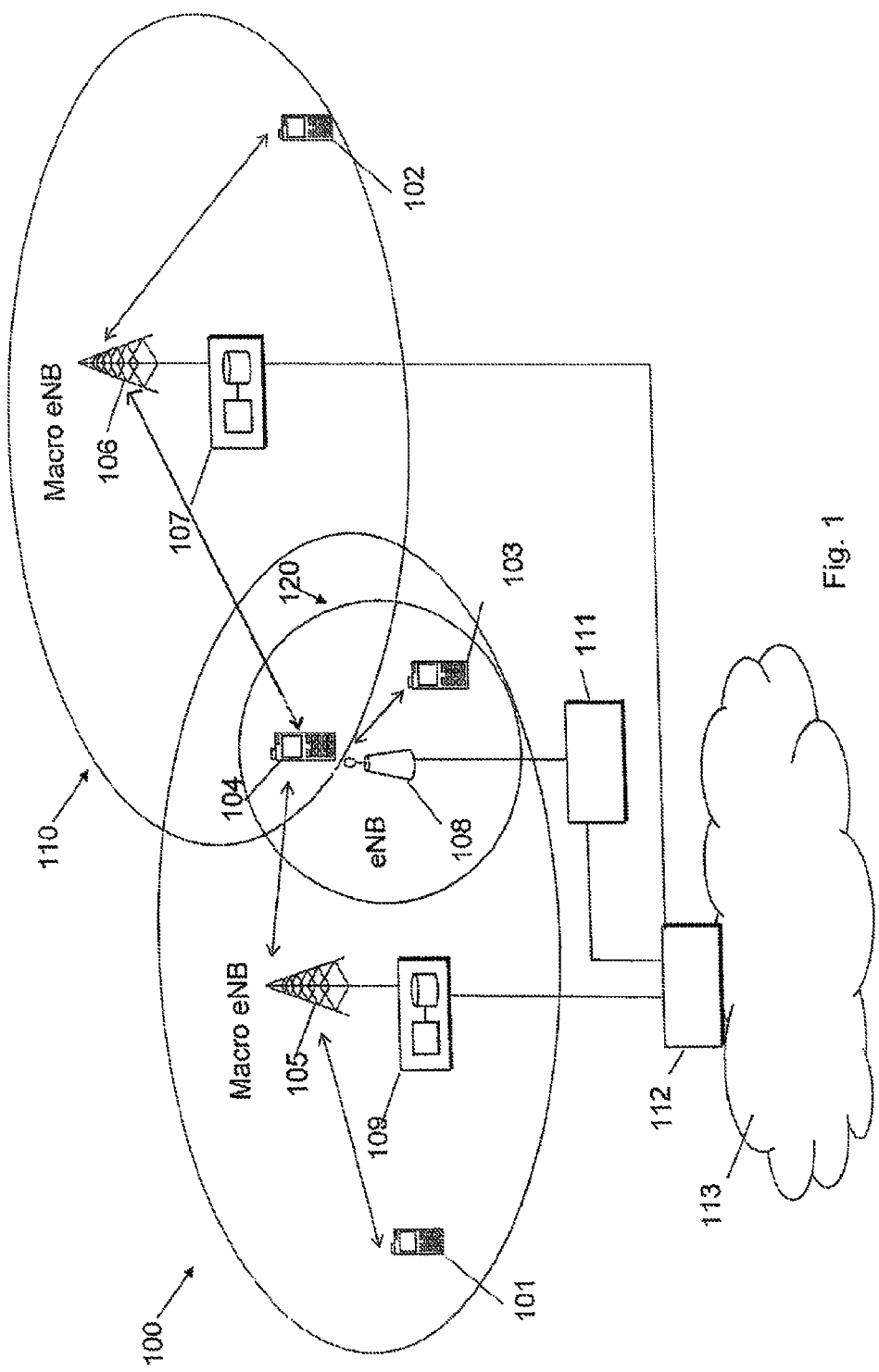
FIG. 1 shows a schematic diagram of a network according to some embodiments.

A mobile communication device or user equipment 101, 102, 103, 104 is typically provided wireless access via at least one base station or similar wireless transmitter and/or receiver node of an access system. In FIG. 1 three neighbouring and overlapping access systems or radio service areas 100, 110 and 120 are shown being provided by base stations 105, 106, and 108.

However, it is noted that instead of three access systems, any number of access systems can be provided in a communication system.

An access system can be provided by a cell of a cellular system or another system enabling a communication device to access a communication system. A base station site 105, 106, 108 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each mobile communication device 101, 102, 103, 104, and base station 105, 106, and 108 may have one or more radio channels open at the same time and may send signals to and/or receive signals from more than one source.

Base stations 105, 106, 108 are typically controlled by at least one appropriate controller apparatus 109, 107 so as to enable operation thereof and management of mobile communication devices 101, 102, 103, 104 in communication with the base stations 105, 106, 108. The control apparatus 107, 109 can be interconnected with other control entities. The control apparatus 109 can typically provided with memory capacity 301 and at least one data processor 302. The control apparatus 109 and functions may be distributed between a plurality of control units. Although not shown in FIG. 1 in some embodiments, each base station 105, 106 and 108 can comprise a control apparatus 109, 107.

In some embodiments, the controller apparatus may be provided by an RNC (Radio Network Controller) or a BSC (Base Station Controller). In some systems such as LTE systems there is no RNC or BSC. However, the controller apparatus may be a MME (mobility management entity) which may be used to control mobility.

The cell borders or edges are schematically shown for illustration purposes only in FIG. 1. It shall be understood that the sizes and shapes of the cells or other radio service areas may vary considerably from the similarly sized omni-directional shapes of FIG. 1. The degree of overlap of cells may also vary considerable from that shown in FIG. 1.

In particular, FIG. 1 depicts two wide area base stations 105, 106, which can be macro-eNBs 105, 106. The macro-eNBs 105, 106 transmit and receive data over the entire coverage of the cells 100 and 110 respectively. FIG. 1 also shows a smaller base station or access point which in some embodiments can be a pico eNB, a home or femto eNB or a micro cell 108. The coverage of the smaller base station 108 may generally be smaller than the coverage of the wide area base stations 105, 106. The coverage provided by the smaller node 108 overlaps with the coverage provided by the macro-eNBs 105, 106. In some embodiments, the smaller node can be a femto or Home eNB. Pico eNBs can be used to extend coverage of the macro-eNBs 105, 106 outside the original cell coverage 100, 110 of the macro-eNBs 105, 106. The pico eNB can also be used to provide cell coverage in "gaps" or "shadows" where there is no coverage within the existing cells 100, 110 and/or may serve "hot spots".

It should be noted that in some embodiments the smaller eNBs may not be present. In alternative embodiments, only smaller eNBs may be present. In some embodiments there may be no macro eNBs.

The communication devices 101, 102, 103, 104 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

Some non-limiting examples of the recent developments in communication systems are the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

In FIG. 1 the base stations 105, 106, 108 of the access systems can be connected to a wider communications network 113. The controller apparatus 107, 109 may be provided for coordinating the operation of the access systems. A gateway function 112 may also be provided to connect to another network via the network 113. The smaller base station 108 can also be connected to the other network by a separate gateway function 111. The base stations 105, 106, 108 can be connected to each other by a communication link for sending and receiving data. The communication link can be any suitable means for sending and receiving data between the base stations 105, 106 and 108 and in some embodiments the communication link is an X2 link.

The other network may be any appropriate network. A wider communication system may thus be provided by one or more interconnect networks and the elements thereof, and one or more gateways may be provided for interconnecting various networks.

Figure 2:
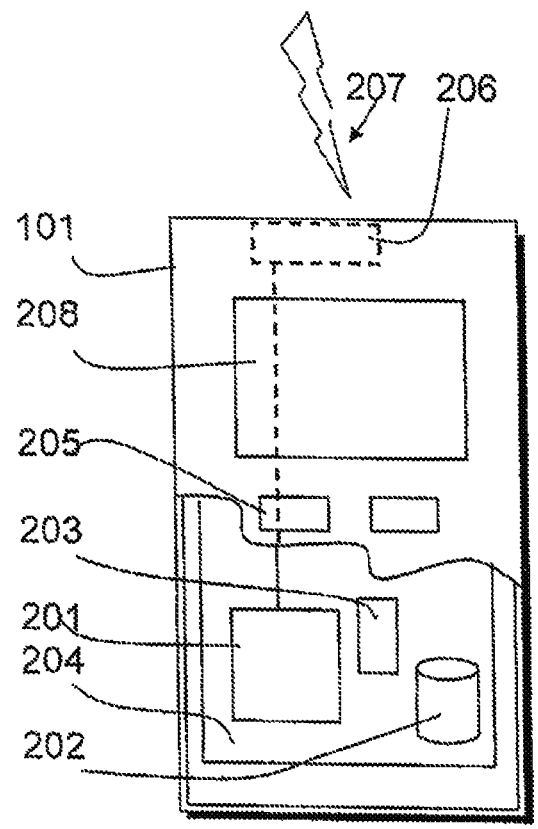
FIG. 2 shows a schematic diagram of a mobile communication device according to some embodiments.

The mobile communication devices will now be described in more detail in reference to FIG. 2. FIG. 2 shows a schematic, partially sectioned view of a communication device 101 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The mobile device 101 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Self organising networks have been proposed. One of the reasons that SONs have been proposed is for energy saving. Using SON, one or more cells may be switched off when traffic load is low. This may result in lower energy consumption over the network. The network operator may be able to save operational costs through, for example, lower power bills and provides more environmentally friendly services to others. This may as a consequence result in fewer $CO_2$ emissions due to the lower energy consumption. Alternatively or additionally, the use of self-organising networks may be helpful where one or more cells need to be shut down for maintenance or the like. Where energy consumption is to be reduced, cells may be switched off. Alternatively or additionally, part of the transmission/receiver chain may be switched off. Additionally or alternatively, the transmission power may be adjusted. There of course may be other examples of methods by which the energy consumption may be reduced.

However, care needs to be taken so that there are no coverage holes or insufficient capacity in parts of the network. Accordingly, in some embodiments, care is taken to ensure that the correct cells to be switched off are identified and the corresponding correct selection of those cells which are able to compensate for the switching off of that cell can be selected. Embodiments may ensure that even if a cell is switched off, a certain quality of service can be maintained.

If traffic load is low at a particular time and area in the network, such as a shopping centre or shopping area at night time, base stations which have a relatively small amount of traffic or a smaller coverage area may be shut down. If the wrong cells are switched off, call or handover drops might occur or high data rate services may not be provided in that area.

It has been previously proposed to use theoretical propagation models and service quality estimations using network planning tools in order to determine those base stations which can be switched off and when. However, it may be time consuming and relatively costly for an operator to detect service outage by drive tests.

Currently, with the handover mechanism of LTE, a user equipment will report not only the strongest cell's identity, (cell ID) and reference signal received power (RSRP) level for that cell, but also other strong cell identities and respective RSRP levels. Alternatively or additionally the user equipment may report a reference signal received quality (RSRQ) for the serving cell and other strong cells. This information is reported by each UE to its serving eNB. With this handover mechanism, it is possible to modify the number of cells and which cells are to be reported by each UE. Accordingly, an eNB will have temporal statistics of reported measurements.

Alternatively or additionally, the above information may be reported periodically. This periodic reporting may take place even if no handover is being considered.

Figure 3:
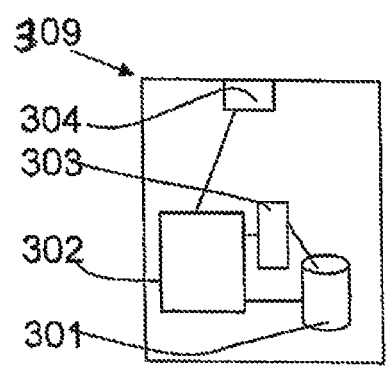
FIG. 3 shows a schematic representation of a SON control apparatus according to some embodiments.

In an embodiment, this information is provided to a management entity such as shown in FIG. 3. This management entity may be an element manager (EM) and network management system (NMS). Alternatively this entity maybe at least partially provided by an eNB and/or a RNC (radio network controller). Where the functionality is provided by an eNB data will be received from neighbouring eNBs via for example the X2 connection or by any other suitable method.

FIG. 3 shows an example self-organising network management controller apparatus for the network entities. The controller apparatus 309 is typically provided with at least one memory 301, at least one data processor 302, 303 and an input/output interface 304 as shown in FIG. 3. This interface may be configured to receive UE measurement information from one or more eNBs (directly or indirectly).

The control apparatus 309, can in some embodiments be provided in a node and comprising at least one memory and computer program code can be configured, with the at least one processor, to cause the node to communicate with other network entities to communicate control information. The control apparatus can be interconnected with other control apparatuses. The node may be a controller node, RNC or an eNB or in any other suitable node.

In embodiments, if a cell is to be potentially shut down safely when handovers are reported to or from it, detectable neighbours should be reported. For a potential cell to be closed down, reports are required from all of the neighbours of that cell in order to make a safe decision. In some embodiments, reports may additionally be required for at least some of the neighbours of those neighbouring cells. In some embodiments, data from an even larger area may be collected. In some embodiments, data from overlapping cells may also be collected.

In some embodiments, at least a third strong cell is detected for every handover region of the cell to be shut down through handover measurements. Those third cells may be the neighbors of the cell to be shut down but not the neighbors of the cell to/from which UE would be handed over. That would ensure that there is at least a third cell safely covering the area of a cell to be shut down and creating a safe handover region with the cell to/from which the UE would be handed over.

The collected statistics may be used to estimate the probability of user outage, should a particular cell be shut down. If the outage probability is acceptable, the cell can be safely shut down. In some embodiments, the outage probability is determined based on the collected statistics. In some embodiments, the cell can be safely shut down. Depending on the probability, it may not be necessary to adjust tilts or powers of any of the neighbouring cells. The outage probability is acceptable if there is no significant risk of a coverage hole between two or more neighbours of the shutdown cell.

If the probability is at a particular level then antenna configuration such as antenna tilt, antenna pattern shape, antenna direction and/or antenna power can be changed in adjacent cells. Further statistics can be collected and if this has decreased the outage probability to an acceptable level, then the cell in question can be switched off.

Figure 4:
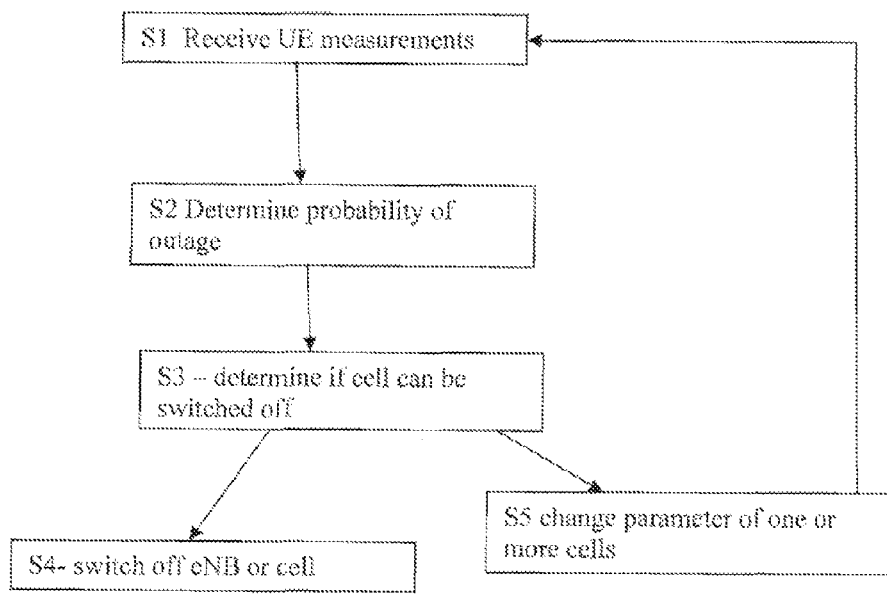
FIG. 4 shows a method of an embodiment.

A method of an embodiment will now be described with more detail with reference to FIG. 4.

In step S1, user equipment measurements are received. These user equipment measurements may take any suitable format. In one embodiment, these measurements comprise cell identity information along with associated signal information.

This information provided by each user equipment may comprise measurements for the serving cell and at least one other cell. The at least one other cell may be predefined, may be any cell having signal information exceeding a threshold and/or may be n other cells, the n other cells being selected in order of signal strength or the like. N is an integer and may be equal to one or more. In case of handover measurements, in some embodiments, there may be target cell measurements, serving cell measurements and measurements from at least one other cell.

The signal information may comprise a measure of signal strength. In one embodiment, this information comprises reference signal received power RSRP. This is a basic UE physical layer measurement and is an average of the downlink reference signals across the channel bandwidth. This information is obtained both in idle and connected states. In some standards, this information is already collected for other purposes. It should be appreciated that any other suitable measure of signal strength associated with a cell may alternatively or additionally be used e.g., RSRQ.

Alternatively or additionally the signal information may comprise a measure of signal quality. In one embodiment this information may comprise reference signal receive quality RSRQ. RSRQ is in some embodiments defined as the ratio between RSRP and a Received Signal Strength Indicator (RSSI). RSSI is the total received wideband power including all interference and thermal noise. RSRQ takes into account signal strength and interference level. Alternatively or additionally other signal quality measures may be taken.

This information is received from the respective user equipment by the eNodeBs. In embodiments, this information is provided to the management controller apparatus.

The user equipment measurements for a number of different cells are collected and in step S2 an outage probability is determined based on the measurements. The determined probability is a key performance indicator KPI in one embodiment. The outage probability at each eNodeB or cell is based on the reported user equipment measurements. The probability of the outage is defined in Equation 1

$$Pr(UE \text{ in outage} | eNB_{off}) = Pr((Q_{RX,eNB_{on,k}} < Q_{RX,min}) \wedge (Q_{RX,eNB_{on,k}} < Q_{RX,min}) \wedge \ldots (Q_{RX,eNB_{on,K}} < Q_{RX,min}))$$

Where
Pr is probability.
$Pr(UE \text{ in outage} | eNB_{off})$ is the probability that a user equipment will encounter outage if a candidate eNodeB is switched off.
K denotes the number of neighbouring cells of the candidate cell to be shut down,
$Q_{RX, MIN}$ is the minimum required received signal power/quality level.
$Q_{RX, eNBon,k}$ is a variable that refers to the strongest received signal power of a cell which is neighbouring cell of the candidate cell to be shut down but not to the cell to/from which UE will be handed over. The value will depend on the UE and base station locations. If the condition $(Q_{RX, eNBon,k} > Q_{RX, MIN})$ is met mostly in the statistics, it means that when the candidate cell is shut down, the coverage area of the shut down cell would be covered by neighbouring cells.

The user equipment outage probability is estimated by collection statistics of the terminals that can detect their own eNodeB cell signal but which are not able to connect to other eNodeBs/cells or the signal strength/quality from other eNBs/cells is below a threshold.

There are two options for each UE either in outage or in coverage. To be in outage, all inequalities should be met. For example, if there are 10 UEs and 2 UEs cannot connect to any other cell (all inequalities are met), this means that outage probability is 20%.

In step 3, a decision is made as to whether or not a candidate eNodeB or cell can be switched off. This will be dependent on Equation 2 below $$Pr(UE \text{ in outage} | eNB_{off}) \leq Pr_{max\ outage}$$

where $Pr_{max\ outage}$ is the maximum allowed outage probability.

If the outage probability is lower than the predefined outage probability threshold, then the candidate eNodeB or cell can be switched off. This is done in step S4. This will involve sending control signals to the candidate eNodeB in order to cause that eNodeB to be switched off.

By way of example only, in one embodiment, a maximum outage probability may be around 5%.

The outage probability KPI is used by the management entity to obtain an optimal combination of cells to be shut down. This can be controlled by following operator policies such as coverage versus capacity constraints and energy saving targets.

If it is determined that the outage probability higher than the predefined outage probability threshold, the control entity may cause one or more parameters of any of the surrounding cells to be changed, in step S5. The method of FIG. 4 is then repeated with the changed parameters in operation. This is in order to minimise outage and/or to maximise the number of eNodeBs to be shut down.

The parameters which may be controlled comprise one or more of base station transmission power level, antenna parameters such as antenna pattern, antenna direction, number of antenna, antenna tilt, uplink power control parameters and handover parameters The control of the change of parameter may be based on an analysis of which one or more UEs are likely suffer outage and their position in a cell which is being targeted for switching off.

In some embodiments, a second threshold may be set for changing the parameters. If the outage probability is lower than this second threshold but higher than the first threshold, then one or more parameters may be changed.

In embodiments, an eNodeB may provide one or more cells or cell sectors. In some embodiments, one or more of those cells or cell sectors may be switched off. In other embodiments the base station itself may be switched off.

Alternative embodiments may use different methods to determine if a candidate base station is to be switched off based on the UE measurements. For example, if all UEs in a cell are able to receive a signal above a given threshold from at least one other cell then that candidate cell or base station is switched off.

Alternatively, a candidate base station or cell may be put in a lower power mode instead of being switched off.

Alternative or additionally some of the antenna of a candidate base station or cell may be switched off, reducing coverage of the cell.

Embodiments may be applied to both centralized and distributed SON function instances.

Alternatively or additionally, embodiments may be used to control the switching off a relay or the like.

It is also noted herein that while the above describes exemplifying embodiments, there are several variations and modifications which may be made to the disclosed solution without departing from the scope of the present invention.

In general, the various embodiments may be implemented in hardware or special purpose circuits, software, logic or any combination thereof. Some aspects of the embodiments may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more of any of the other embodiments previously discussed.

The invention claimed is:

1. A method comprising:
    receiving from a plurality of user equipment signal information for at least one cell;
    using said information to determine if a candidate cell is to enter a reduced power mode; and
    ensuring that another cell is covering the area of the candidate cell before the candidate cell enters the reduced power mode.

2. A method as claimed in claim 1, wherein said signal information comprises handover information.

3. A method as claimed in claim 1, wherein said signal information comprises at least one of signal strength information and signal quality information.

4. A method as claimed in claim 1, comprising comparing said signal information for at least one cell with a minimum value for said signal information.

5. A method as claimed in claim 1, comprising receiving from each of said plurality of user equipment, signal information for a serving cell and at least one other cell, different to said candidate cell.

6. A method as claimed in claim 1, comprising receiving information for at least one cell neighbouring said candidate cell for which a determination is to be made as to whether said candidate cell is to enter a reduced power mode.

7. A method comprising;
    receiving from a plurality of user signal information for at least one cell;
    using said information to determine if a candidate cell is to enter a reduced power mode; and
    using said received information to determine a probability of an outage for a user equipment if said candidate cell is entered into a reduced power mode.

8. A method as claimed in claim 7, wherein said determining a probability of an outage is dependent on information for one or more user equipment which only receive signals from a serving cell.

9. A method as claimed in claim 7, comprising entering said candidate cell into a reduced power mode if said probability of an outage is less than a threshold.

10. A method as claimed in claim 1, wherein said reduced power mode comprises switching said cell off.

11. A method comprising:
    receiving from a plurality of user equipment signal information for at least one cell; and
    using said information to determine if a candidate cell is to enter a reduced power mode,
    wherein if it is determined that a candidate cell is not to enter a reduced power mode, causing at least one parameter of at least one neighbouring cell to be altered and repeating said method.

12. A method as claimed in claim 11, wherein said at least one parameter comprises at least one of antenna configuration; antenna orientation; transmission power; and uplink power control parameters.

13. A non-transitory computer-readable medium encoding instructions that, when executed in hardware, perform a process, the process comprising:
    receiving from a plurality of user equipment signal information for at least one cell;
    using said information to determine if a candidate cell is to enter a reduced power mode; and
    ensuring that another cell is covering the area of the candidate cell before the candidate cell enters the reduced power mode.

14. Apparatus comprising:
    means for receiving from a plurality of user equipment signal information for at least one cell;
    means for using said information to determine if a candidate cell is to enter a reduced power mode; and
    means for ensuring that another cell is covering the area of the candidate cell before the candidate cell enters the reduced power mode.

15. Apparatus comprising:
    means for receiving from a plurality of user equipment signal information for at least one cell; and
    means for using said information to determine if a candidate cell is to enter a reduced power mode, wherein said using means is for determining a probability of an outage dependent on information for one or more user equipment which only receive signals from a serving cell.

* * * * *